United States Patent
Smith

(10) Patent No.: US 9,608,425 B2
(45) Date of Patent: Mar. 28, 2017

(54) SPACER AND/OR SPACER DAMPER

(71) Applicant: Preformed Line Products, Mayfield Village, OH (US)

(72) Inventor: Andrew Smith, Pietermaritzburg (ZA)

(73) Assignee: Preformed Line Products, Mayfield Village, OH (US)

( * ) Notice: Subject to any disclaimer, the term of this patent is extended or adjusted under 35 U.S.C. 154(b) by 817 days.

(21) Appl. No.: 13/842,945

(22) Filed: Mar. 15, 2013

(65) Prior Publication Data
US 2014/0263870 A1    Sep. 18, 2014

(51) Int. Cl.
*H02G 7/12*    (2006.01)

(52) U.S. Cl.
CPC ............... *H02G 7/125* (2013.01); *H02G 7/12* (2013.01)

(58) Field of Classification Search
CPC    H02G 7/12; H02G 7/125; H02G 7/14; H02G 7/05; F16B 2/10; Y10T 24/3962; Y10T 24/44504; Y10T 24/3958
USPC ............................ 248/68.1; 741/42; 24/122.3
See application file for complete search history.

(56) References Cited

U.S. PATENT DOCUMENTS

| | | | | |
|---|---|---|---|---|
| 3,083,258 A * | 3/1963 | Edwards | ................ | H02G 7/125 174/146 |
| 3,613,104 A * | 10/1971 | Bradshaw | ............... | H02G 7/125 174/146 |
| 3,784,723 A * | 1/1974 | Cantamessa | ........... | H02G 7/125 174/146 |
| 3,885,086 A * | 5/1975 | Houston | ................ | H02G 7/125 174/146 |
| 3,963,855 A * | 6/1976 | Hawkins | .................. | H02G 7/12 174/146 |
| 3,971,881 A * | 7/1976 | Hawkins | ................ | H02G 7/125 174/146 |
| 3,978,276 A * | 8/1976 | Poffenberger | ......... | H02G 7/125 174/146 |
| 4,012,582 A * | 3/1977 | Hawkins | ................ | H02G 7/125 174/146 |
| 4,188,502 A * | 2/1980 | Gagne | .................... | H02G 7/125 174/146 |
| 4,242,537 A * | 12/1980 | Hearnshaw | ............ | H02G 7/125 174/146 |

(Continued)

FOREIGN PATENT DOCUMENTS

| | | |
|---|---|---|
| EP | 0555751 A1 | 8/1993 |
| GB | 1220084 | 1/1971 |

OTHER PUBLICATIONS

Int. Search Report cited in PCT Application No. PCT/US2014/025830 dated Jul. 22, 2014, 9 pgs.

*Primary Examiner* — Nkeisha Smith
(74) *Attorney, Agent, or Firm* — Cooper Legal Group, LLC

(57) ABSTRACT

Among other things, a spacer unit for spacing apart a bundle of cables is provided. The spacer unit comprises two or more spacer assemblies which are adjustable to provide for various sized bundle configurations and/or to provide for various degrees of spacing. Respective spacer assemblies comprise a housing apparatus and a modular frame. The housing apparatus couples to a clamping arm that clamps to a cable. The modular frame allows the spacer assembly to be coupled to other spacer assemblies to vary a configuration of a spacing unit, and is configured for selective rotation relative to the housing apparatus to facilitate altering a shape of the spacer assembly.

20 Claims, 6 Drawing Sheets

(56) References Cited

U.S. PATENT DOCUMENTS

| | | | | |
|---|---|---|---|---|
| 4,480,149 A * | 10/1984 | Hawkins | ............... | H02G 7/125 |
| | | | | 174/146 |
| 4,554,403 A * | 11/1985 | Hearnshaw | ............ | H02G 7/125 |
| | | | | 174/146 |
| 5,371,320 A * | 12/1994 | Torok | .................... | H02G 7/125 |
| | | | | 174/146 |
| 8,079,122 B2 * | 12/2011 | Kwon | ...................... | H02G 7/14 |
| | | | | 29/242 |
| 9,106,062 B2 * | 8/2015 | De France | ............... | H02G 7/12 |
| 2008/0173462 A1 * | 7/2008 | Whapham | .............. | H02G 7/125 |
| | | | | 174/42 |
| 2015/0229113 A1 * | 8/2015 | Dobrinski | .............. | H02G 7/125 |
| | | | | 174/42 |

* cited by examiner

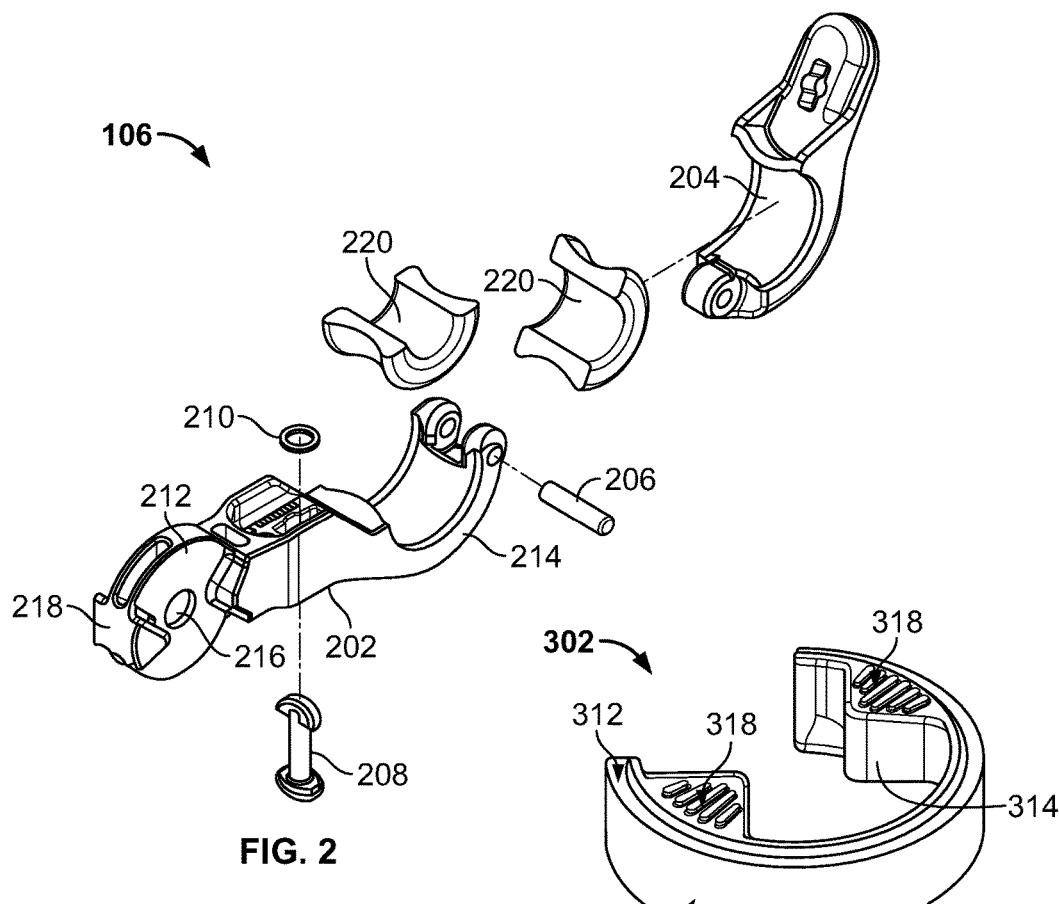
FIG. 2
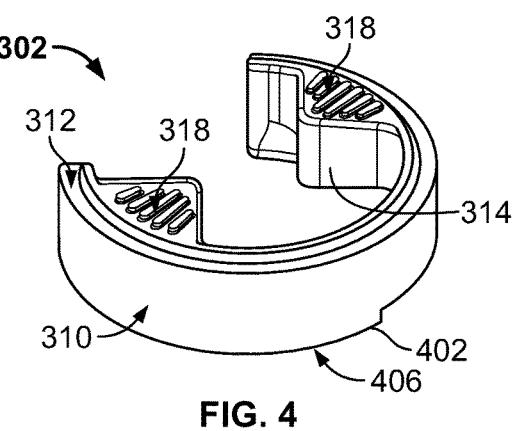
FIG. 4
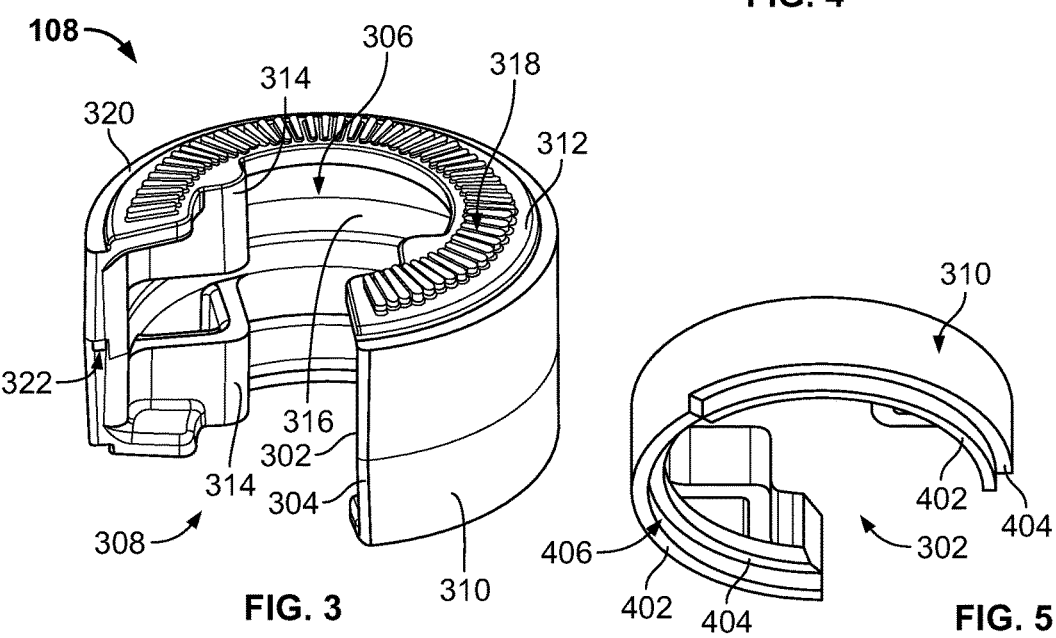
FIG. 3
FIG. 5

SPACER AND/OR SPACER DAMPER

BACKGROUND

The present application relates to, among other things, an apparatus and kit-of-parts for maintaining a desired spacing between power lines, such as power lines of a power transmission system. Such an apparatus and/or kit-of-parts may be further configured to suppress vibrations and/or oscillations in aerial cables, for example. The subject matter disclosed herein also relates to other applications where is it desired to maintain a desired spacing between two cables and/or to suppress vibrations in a cable.

A power system comprises a network of electrical components or power system equipment configured to supply, transmit, and/or use electrical power. For example, a power grid (e.g., also referred to as an electrical distribution grid) typically comprises generators, transmission systems, and/or distribution systems. Generators are configured to produce electricity from combustible fuels (e.g., coal, natural gas, etc.) and/or non-combustible fuels (e.g., such as wind, solar, nuclear, etc.). Transmission systems are configured to carry or transmit the electricity from the generators to loads. Distribution systems are configured to feed the supplied electricity to end consumers, such as nearby homes, commercial businesses, and/or other establishments.

Transmission systems and/or distribution systems generally comprise transmission lines, which may be characterized into classes, such as high voltage lines less than 300 kilovolts (kV), extra high voltage (EHV) lines for voltages between 300 kV and 500 kV, and ultra high voltage (UHV) lines for voltages in excess of 500 kV, where various classes are used to transmit power between various parts of a power system. For example, the transmission system typically employs EHV and UHV lines to transfer power between the generator and the distribution system, such as a substation, where the voltage is stepped down. As another example, the distribution system typically employs high voltage lines to transfer power between the distribution system and the consumer.

To economically design transmission systems and/or distribution systems, engineers often bundle a plurality of power lines to form a bundled conductor. While a bundled conductor increases efficiencies in design, there are a number of design challenges that arise when two or more conductors are spatially proximate one another and/or tied together. For example, care must be taken to inhibit a first power line (also referred to as a conductor) from contacting a second power line, which may result in a fault (e.g., potentially damaging power equipment and/or potentially resulting in a loss of power). Accordingly, spacers are commonly used to maintain a desired spacing between two or more conductors. Such spacers are typically non-conducting and in some embodiments are further configured to dampen vibration in power lines. Spacers that are also configured to dampen vibration are sometimes referred to as spacer dampers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a spacer unit for power lines and/or other cables is provided. The spacer unit is modifiable to accommodate various bundle configurations. For example, the spacer unit may be modifiable to accommodate bundle configurations that range in size from two cables to six or more cables. In some embodiments, the spacer unit is further modifiable to vary a distance between cables. In this way, a kit of parts that is used to assemble a two-cable spacer unit that spaces the cables 10 inches apart can be also be used to assemble a four-cable spacer unit that spaces the cables 8 inches apart, for example. Moreover, the assembly can occur at a manufacturing facility and/or on-site at a field project, for example.

The spacer unit comprises two or more spacer assemblies, where the number of spacer assemblies is typically equal to the number of cables that are in the bundle. Respective spacer assemblies comprise, among other things, a housing apparatus for coupling to a clamp arm into which the cable is seated and a modular frame for connecting the spacer assembly to another spacer assembly. The modular frame is configured for selective movement (e.g., rotation) relative to the housing apparatus to provide for altering a position of the spacer assembly relative to one or more other spacer assemblies of the spacer unit, for example.

In some embodiments, at least one of the housing apparatus or the modular frame comprises an engagement feature configured to selectively engage the modular frame with the housing apparatus to inhibit relative movement between the modular frame and the housing apparatus. By way of example, at times when the modular frame is not engaged with the housing apparatus, the modular frame may be configured for rotation relative to the housing apparatus. At times when the modular frame is engaged with the housing apparatus, rotation of the modular frame relative to the housing apparatus may be inhibited.

In some embodiments, the modular frame is configured to be selectively coupled to a second modular frame of a second spacer assembly to form the spacer unit.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

FIGURES

The application is illustrated by way of example and not limitation in the figures of the accompanying drawings, in which like references generally indicate similar elements and in which:

FIG. 2 illustrates an example clamping arm of a spacer unit.

FIG. 3 illustrates an example housing apparatus of a spacer unit.

FIG. 4 illustrates an isometric top view of a first portion of an example housing apparatus of a spacer unit.

FIG. 5 illustrates an isometric bottom view of a first portion of an example housing apparatus of a spacer unit.

DESCRIPTION

Figure 1:
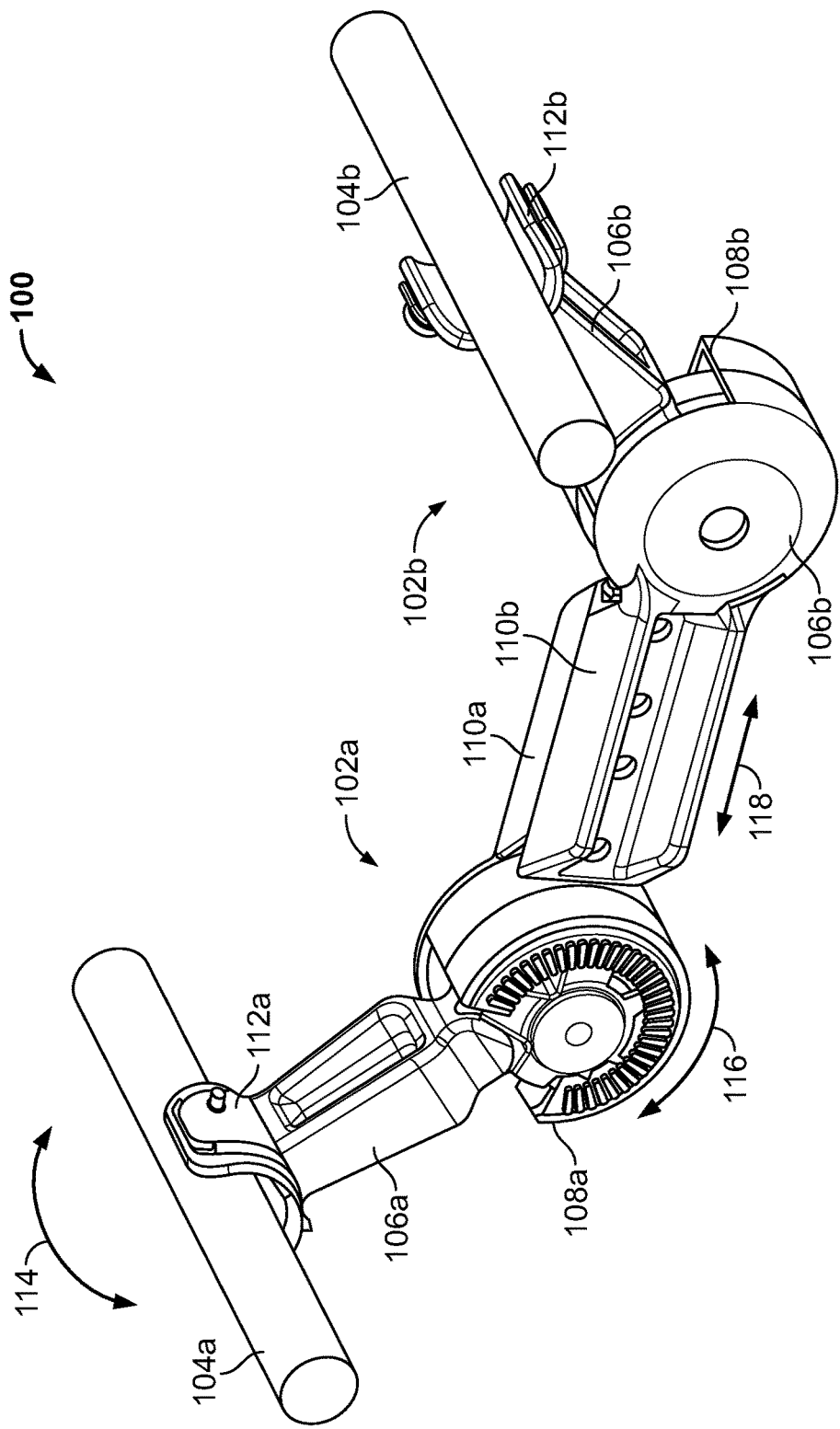
FIG. 1 illustrates an example spacer unit for a cable bundle having a twin configuration.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing subject matter.

Among other things, a spacer unit, spacer assembly, and a kit-of-parts are provided. The spacer unit, comprising two or more spacer assemblies and formed from the kit-of-parts, is configured to maintain a desired spacing between two or more cables, such as power lines or other electrical conductors, to mitigate environmental effects, overheating, and/or damage to one or more of the cables. For example, the spacer unit is configured to inhibit clashing and/or the like of the cables due to wind, ice, etc., which may create a short-circuit or other fault if a load is applied to the cables while the cables are in contact with one another (e.g., potentially harming the cable and/or surrounding environment). Further, in some embodiments, the spacer unit is a spacer damper further configured to dampen vibrations and/or oscillation in the cable, such as induced by wind, for example.

Generally, such spacer units are used in the spans between supporting structures (e.g., towers) to maintain the shape of a bundle of cable, such as a bundled conductor. In a typical configuration, the spacer units are positioned at intervals within the span. For example, the spacer units can be positioned at 150 feet to 200 feet intervals along the span, although spacing intervals can vary as appropriate.

The spacer unit is modifiable to accommodate bundles of cable that range in number from two cables to six or more cables. One typical bundle configuration is referred to as a 'Twin' configuration (e.g., as shown in FIG. 1), which can form a horizontal, vertical, or diagonal arrangement. Other typical configurations include a Tri' configuration, generally shaped to form a triangle; a 'Quad' configuration, generally shaped to form a square or diamond; and a 'Hex' configuration, which is generally substantially circular.

The spacer unit is further modifiable to vary a distance between cables of a bundle. For example, a spacing of 10 inches may be desirable for a first application and a spacing of 8 inches may be desirable for a second application. In some embodiments, the respective distances can be achieved without altering tooling specifications utilized to manufacturer the spacer unit. In this way, the spacing can be determined at assembly time as opposed to at the time parts of the spacer assembly are manufactured, for example.

Referring to FIG. 1, an example spacer unit 100 configured to accommodate a cable bundle having a twin-configuration is illustrated. The example spacer unit 100 comprises two spacer assemblies 102a, 102b, which are coupled together via adjoining modular frames 110a and 110b. The first spacer assembly 102a is further coupled to a first cable 104a, and the second spacer assembly 102b is further coupled to a second cable 104b.

Respective spacer assemblies 102 comprise a modular frame 110, a housing apparatus 108, and a clamp arm 106. For example, the first spacer assembly 102a comprises a first clamp arm 106a, a first housing apparatus 108a, and a first modular frame 110a. Likewise, the second spacer assembly 102b comprises a second clamp arm 106b, a second housing apparatus 108b, and a second modular frame 110b.

It will be appreciated that although the functions and/or arrangement of components of the second spacer assembly 102b and/or other spacer assemblies mentioned herein are not described, the functions and/or arrangement of components of these spacer assemblies may be substantially similar to that described with regard to the first spacer assembly 102a.

In the first spacer assembly 102a, the first clamp arm 106a extends from the first housing apparatus 108a to the first cable 104a and is configured to secure the spacer unit 100 to the first cable 104a. In the illustrated embodiment, the first clamp arm 106a forms a substantially u-shaped connector 112a into which the first cable 104a is seated (e.g., where the first cable 104a may be held by the first clamp arm 106a via tension and/or via an armor rod that is (e.g., helically) wrapped around the first cable 104a and/or the u-shaped connector 112a or other portion of the clamp arm 106a to secure the first cable 104a to the first clamp arm 106a). In other embodiments, the connector 112a is shaped differently and/or is configured to substantially surround the first cable 104a. By way of example, in some applications, the connector 112a may be substantially c-shaped. In other applications, such as shown in FIG. 2, the clamp arm may comprise a substantially claw-like portion configured to clamp or close around the first cable 104a to secure the first clamp arm 106a to the first cable 104a. Moreover, in some embodiments, a clamp liner, such as a substantially non-conductive element (e.g., a rubber liner), can be positioned between the first cable 104a and the u-shaped connector 112a and/or another portion of the clamp arm 106a to reduce damage to and/or wear on the cable 104a and/or the u-shaped connector 112a, for example.

The first clamp arm 106a is coupled to the first housing apparatus 108a. In some embodiments, the first clamp arm 106a is adjustably secured to the first housing apparatus 108a, such as to allow the first clamp arm 106a to pivot or move relative to the first housing apparatus 108a (e.g., where the pivoting motion is shown in FIG. 1 via reference character 114). In other embodiments, the first clamp arm 106a is fixedly secured to the first housing apparatus 108a to inhibit movement of the first clamp arm 106a relative to the first housing apparatus 108a.

The first modular frame 110a of the first spacer assembly 102a is further coupled to the first housing apparatus 108a and is configured to be coupled to the second modular frame 110b of the second spacer assembly 102b (e.g., to facilitate coupling the first spacer assembly 102a to the second spacer assembly 102b).

In some embodiments, the first modular frame 110a is further configured for selective movement relative to the first housing apparatus 108a. By way of example, the first modular frame 110a may be configured for rotation relative to the first housing apparatus (e.g., where the rotation is shown in FIG. 1 via reference character 116). In this way, an orientation of the first modular frame 110a relative to the first clamp arm 106a can be varied to adjust a distance and/or orientation between the first cable 104a and the first modular frame 110*a*. Moreover, such selective movement may provide for customizing the spacing between the first cable 104*a* and the second cable 104*b* and/or customizing a relative orientation between the first cable 104*a* and the second cable 104*b*, for example.

An engagement feature (not shown) is configured to, at times, engage the first housing apparatus 108*a* with the first modular frame 110*a* to inhibit movement of the first modular frame 110*a* relative to the first housing apparatus 108*a*. In this way, once a desired geometric shape and/or configuration for the first spacer assembly 102*a* has been satisfied, the engagement feature can fix the first modular frame 110*a* to the first housing apparatus 108*a*, and vice versa, to inhibit further movement of the first modular frame 110*a* relative to the first housing apparatus 108*a*.

In some embodiments, the first modular frame 110*a* is further configured to facilitate adjusting or customizing the spacing between the first housing apparatus 108*a* and the second housing apparatus 108*b*. For example, in some embodiments, the first modular frame 110*a* is configured slide relative to the second modular frame 110*b* to adjust the spacing (e.g., where the sliding motion is shown in FIG. 1 via reference character 118).

FIG. 2 illustrates an exploded view of an example clamp arm 106. The example clamp arm 106 comprises an arm 202 and a keeper 204, which may be constructed out of electrically conducting and/or electrically non-conducting materials that are rigid and/or semi-rigid. For example, in some embodiments, the arm 202 and the keeper 204 are constructed of an aluminum-alloy or other suitable metal-alloy. In some embodiments, the arm 202 and the keeper 204 are constructed out of the same material(s). In other embodiments, the arm 202 may be constructed out of one or more materials that differ from the materials utilized to construct the keeper 204.

The arm 202 and the keeper 204 can be connected in a hinge-type fashion using a pin 206 and/or other attachment elements which facilitate pivoting the keeper 204 relative to the arm 202. In some embodiments the pin 206 and/or other attachment element(s) can be constructed of an aluminum alloy or other suitably rigid or semi-rigid material, which may be electrically conductive and/or electrically non-conductive. Upon hinging into a 'closed' position around a cable, a retainer pin 208 and elastomer grommet 210 and/or other suitable locking mechanism can be employed to secure the end opposite of the hinge to retain a closed position.

In other embodiments, other attachment elements which are not configured to facilitate a pivoting motion of the keeper 204 relative to the arm 202, such as an interlocking mechanism, hook/catch, etc. can be employed to connect the arm 202 to the keeper 204.

The arm 202 comprises a base portion 212 and a head portion 214. The base portion 212 is configured to facilitate coupling the arm 202 to the housing apparatus 108 of a spacer assembly 102, and the head portion 214 is configured to facilitate coupling the arm 202 to a cable 104. In the illustrated embodiments, the base portion 212 is configured to be seated within an interior cavity (e.g., bore) of the housing apparatus 108 and is molded or otherwise shaped according to the interior cavity. For example, as illustrated in FIG. 2 the base portion 212 is substantially cylindrically shaped. The base portion 212 further defines an aperture 216 through which a pin, bolt or other fastener can be inserted to secure the clamp arm 106 to the housing apparatus 108.

The base portion 212 of the illustrated embodiment comprises a stop 218 configured to inhibit rotation of the clamp arm 106 relative to the housing apparatus 108 upon the clamp arm 106 being seated within the interior cavity of the housing apparatus 108. In other embodiment, the base portion 212 is shaped differently (e.g., to fit within the interior cavity of the housing apparatus 108) and/or does not comprise a stop 218. In still other embodiments, the clamp arm 106 is secured to an outer parameter of the housing apparatus 108, and thus the base portion 212 may be configured differently to provide for coupling to such a parameter(s).

In some embodiments, including the illustrated embodiment, a clamp liner 220 can be inserted into a suitable area of the arm 202 and/or keeper 204 in order to secure a cable 104 upon application. Although the clamp liner 220 is illustrated as two symmetrical halves, it is to be understood that other liner configurations can be employed for use in securing the cable 104. By way of example, in other embodiments, the clamp liner 220 can be constructed in a single 'donut,' or other cylindrical shape having a single separation region or slot for connection to the cable 104.

Moreover, while a cylindrical clamp liner 220 is shown, it is to be understood that the insert can be of any suitable shape so as to support of the cable 104. For example, in other embodiments, the clamp liner 220 can have a square or block exterior shape having a round or cylindrical groove within. Accordingly, the cylindrical groove can grip the cable 104 while the exterior shape can provide for insertion within the head portion 214 of a clamp arm 106, for example. The thickness, elasticity, and/or rigidity of the materials described herein, as well as their composition, can be dependent upon a desired application, for example. By way of example, in some embodiments, the clamp liner 220 is made of a rubber compound configured to reduce damage to and/or wear on the cable 104.

FIG. 3 illustrates an example housing apparatus 108, which may be constructed out of electrically conducting and/or electrically non-conducting materials that are rigid and/or semi-rigid and is configured to be coupled to the clamp arm 106 and to the modular frame 110. In some embodiments, the housing apparatus 108 is constructed from two or more members that are joined together to form the housing apparatus 108. By way of example, in the illustrated embodiment, the housing apparatus 108 is comprised of a first housing member 302 and a second housing member 304 which divide the housing apparatus 108 into halves and are joined along an axial face such as via a resin, weld, and/or other fastener (e.g., rivet, screw, bolt, etc.). In some embodiments, such as illustrated, the first housing member 302 and second housing member 304 are identical. In other embodiments, the first housing member 302 and the second housing member 304 are not identical (e.g., the first housing member 302 may comprise one or more features not comprised in the second housing member 304 and/or a variation of a feature comprised in the second housing member 304). In still other embodiments, the housing apparatus 108 may have a unibody design.

In the illustrated embodiment, the housing apparatus 108 is substantially C-shaped, and the clamp arm 106 is configured to be seated within an interior cavity 306 of the housing apparatus 108. An aperture 308 in a radially outer face 310 of the housing apparatus 108 allows the clamp arm 106 to outwardly extend from the housing apparatus 108. In other embodiments, the housing apparatus 108 may be shaped differently. For example, in some embodiments, the housing apparatus 108 may be U-shaped, square-shaped, etc. In still other embodiments, the clamp arm 106 may be secured to an outer parameter, such as the radially outer face 310 and/or an axially end face 312 of the housing apparatus 108. Accordingly, the housing apparatus 108 may not comprises a hollow interior cavity 306 and/or may not comprise the aperture 308.

In some embodiments, the housing apparatus 108 is configured to fixedly secure the clamp arm 106 within the interior cavity 306. By way of example, in the illustrated embodiment, the housing apparatus comprises one or more stops 314 positioned within an interior cavity 306 of the housing apparatus 108. Such stops 314 may be integral with an interior face 316 of the housing apparatus 108 (e.g., to form part of the interior face 316) or may be detachable from the interior face 316. In some embodiments, such stops 314 are configured to function with a stop 218 of the clamp arm 106 to inhibit movement and/or rotation of the clamp arm 106 relative to the housing apparatus 108. By way of example, the stop 218 of the clamp arm 106 may be configured to be seated between two or more stops 314 of the housing apparatus 108 to inhibit such movement and/or rotation. In other embodiments, such stops 314 may be used to secure a dampening element within the housing apparatus 108, for example.

While the example embodiment of the housing apparatus 108 comprises stops, in other embodiments, the interior face 316 is substantially circular and/or devoid of such stops 314. For example, in embodiments where it is desirable for the clamp arm 106 to rotate relative to the housing apparatus 108, such stops 314 may be undesirable and/or spaced apart from the stop 218 of the clamp arm 106 to allow for at least some movement of the clamp arm 106 relative to the housing apparatus 108. In other embodiments, the clamp arm 106 may be fixedly secured to the housing apparatus 108 via an adhesive or other fastener, and thus such stops 314 may be optional to inhibit movement and/or rotation of the clamp arm 106 relative to the housing apparatus 108, for example.

In some embodiments, the housing apparatus 108 further comprises an engagement feature configured to selectively engage a modular frame 110 coupled to the housing apparatus 108. When the engagement feature is engaged, relative movement between the modular frame 110 and the housing apparatus 108 may be inhibited. When the engagement feature is not engaged, relative movement between the modular frame 110 and the housing apparatus 108 may be non-inhibited, for example.

By way of example, the housing apparatus 108 in FIG. 3 comprises a plurality of splines 318 arranged at the axially end face 312 of the housing apparatus 108. Such splines 318 may be selectively coupled with splines arranged on an axial face of the modular frame 110 to inhibit relative movement. That is, when the splines 318 of the housing apparatus 108 are coupled to the splines of the modular frame 110 (e.g., causing the splines to be interwoven), relative motion between the housing apparatus 108 and the modular frame 110 may be inhibited. When the splines 318 of the housing apparatus 108 are spaced apart from the splines of the modular frame 110, the modular frame 110 may be configured to move and/or rotate relative to the housing apparatus 108.

In the illustrated embodiment, the splines 318 are arranged along a circumference of the axially end face 312 and extend radially toward a center axis of the housing apparatus 108. In other embodiments, the splines 318 may be arranged differently. For example, the splines 318 may be arranged to extend circumferentially along the axially end face 312. Moreover, in other embodiments, the engagement feature may be positioned at the radially outer face 310 and an interior face 316 (e.g., extending axially and/or radially), for example.

In some embodiments, splines 318 and/or another engagement feature(s) also may be arranged along a second axially end face of the housing apparatus 108 that is substantially diametrically opposite the first axially end face 312. For example, in embodiments where the spacer unit is configured to bundle configurations of three or more cables, respective spacer assemblies 102 may comprise two modular frames (e.g., one for connecting the spacer assembly to a second spacer assembly and one for connecting the spacer assembly to a third spacer assembly). Accordingly, a first modular frame 110 can be connected to a first axially end face 312 and can be inhibited from rotating by a first engagement feature (e.g., a first set of splines 318) and a second modular frame 110 can be connected to a second axially end face of the housing apparatus 108 and can be inhibited from rotating by a second engagement feature (e.g., a second set of splines 318).

Although specific reference is made herein to splines, the engagement feature may comprise other types of mechanical devices and/or non-mechanical structures configured to inhibit relative movement and/or rotation. By way of example, the engagement feature may comprise a friction device configured to create friction between the housing apparatus 108 and the modular frame 110 and/or a pressure device configured to apply a pressure that inhibits such movement and/or rotation. In still other embodiments, the engagement feature may comprise a clamp, adhesive material, and/or fastener that is applied when the desired configuration for the housing apparatus 108 and modular frame 110 has been achieved.

Further, in some embodiments, the housing apparatus 108 comprises a channel 320 extending circumferentially along the axially end face 312, and the modular frame 110 comprises a lip configured to be seated within the channel 320. In this way, radial movement of the modular frame 110 (e.g., side-to-side movement) relative to the housing apparatus 108 may be mitigated, for example.

FIG. 4 illustrates a top isometric view of an example first housing member 302 and FIG. 5 illustrates a bottom isometric view of the example first housing member 302. It is to be appreciated that while FIG. 3 illustrates the splines 318 as extending substantially continuously along an axially end face 312, the first housing member 302 shown in FIG. 4 merely illustrates the splines 318 as extending along a portion of the axially end face 312, such as along a portion of the axial end face 312 adjacent the stops 314.

In the embodiment illustrated in FIGS. 4-5, the first housing member 302 comprises a male portion 402 and a female portion 404 extending circumferentially in parallel along an axial face 406 of the first housing member 302. The male portion 402 is configured to be seated within a female portion of a second housing member 304 and the female portion 404 is configured receive a male portion of the second housing member 304. In this way, as shown at the seam 322 in FIG. 3 between the first housing member 302 and the second housing member 304, the first housing member 302 overlaps the second housing member 304 to mitigate lateral movement of the first housing member 302 relative to the second housing member 304 (e.g., in a direction substantially perpendicular to an axis running through the interior cavity 306).

In some embodiments, including the illustrated embodiment, the male portion is adjacent a radially outer face 310 (e.g., and forms part of the radially outer face 310) for a first part of a circumference of the first housing member 302, and the female portion is adjacent the radially outer face 310 (e.g., and forms part of the radially outer face 310) for a second part of the circumference. That is, the male portion 402 has a first orientation relative to the female portion 404 for a first part of the circumference and a second orientation relative to the female portion 404 for a second part of the circumference (e.g., where the second orientation may be reversed from the first orientation). In this way, rotation of the first housing member 302 relative to the second housing member 304 is inhibited when the first housing member 302 and second housing member 304 are coupled together, for example.

In some embodiments, the second housing member 304 is symmetrical with the first housing member 302 and thus the second housing member 304 may comprise features that are similar to the foregoing features of the first housing member 302. In other embodiments, the first housing member 302 and the second housing member 304 may be asymmetrical. For example, the first housing member 302 may comprise merely the male portion 402 at the axial face 406 and the second housing member 304 may comprise merely a female portion at an adjacent axial face and/or vice-versa. In still another embodiments, an axial face 406 of the first housing member 302 may be substantially planer and may join a substantially planer axial face of the second housing member 304, for example.

Figure 6:
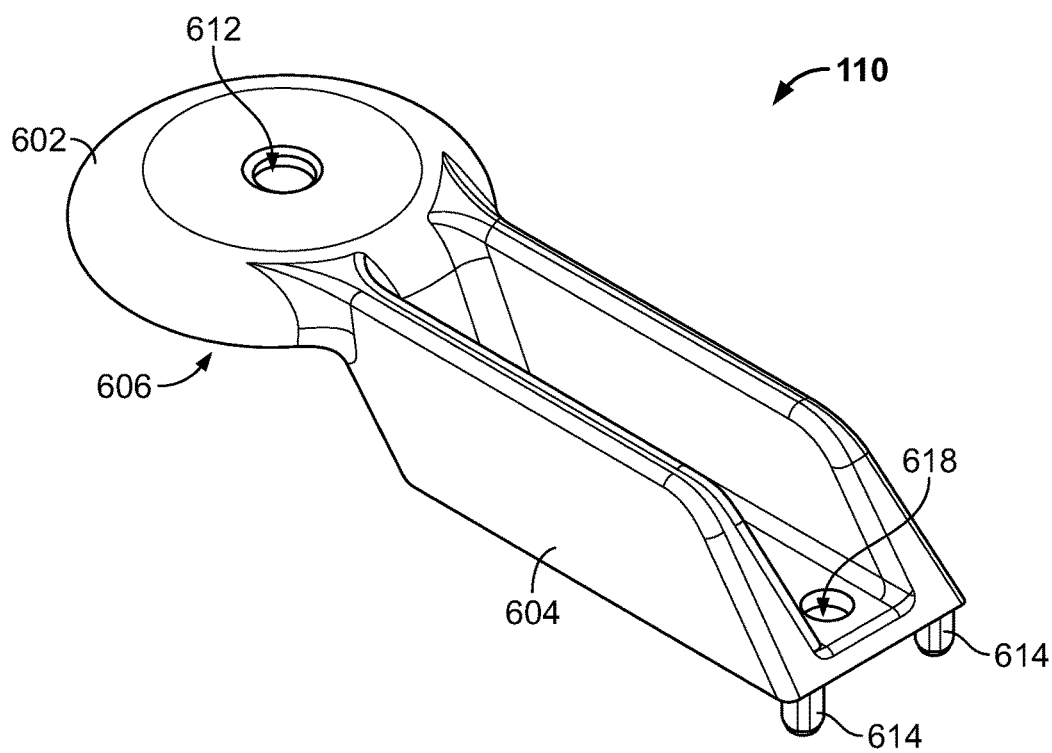
FIG. 6 illustrates an isometric top view of an example modular frame of a spacer unit.
Figure 7:
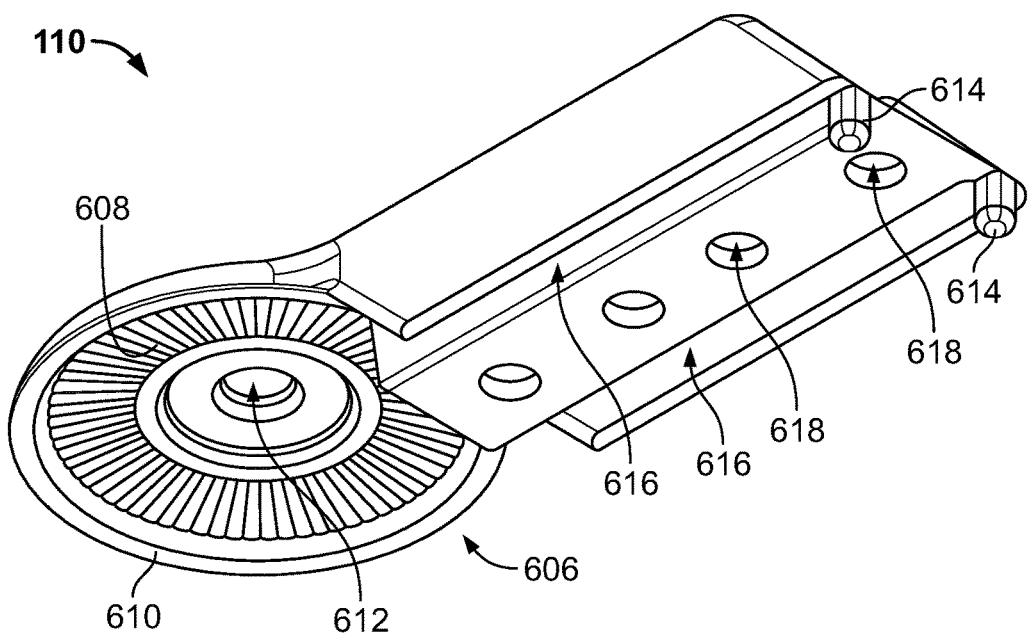
FIG. 7 illustrates an isometric bottom view of an example modular frame of a spacer unit.

FIG. 6 illustrates a top isometric view of a first modular frame 110 and FIG. 7 illustrates a bottom isometric view of the first modular frame 110 such as may be part of a spacer assembly 102. In some embodiments, such as where the spacing unit is configured to support a bundle configuration of three or more cables, respective spacer assemblies 102 may comprise two such modular frames. In embodiments where the spacing unit is configured to support a bundle configuration of merely two cables, such as illustrated in the twin-configuration of FIG. 1, respective spacer assemblies 102 may comprise merely one modular frame, for example.

The first modular frame 110 comprises a base portion 602 configured to mount to the housing apparatus 108 and an arm 604 for coupling the first modular frame 110 to a second modular frame of a second spacer assembly, for example. In the example embodiment, the base portion 602 is substantially cylindrical to match the substantially cylindrical shape of the housing apparatus 108 shown in FIGS. 1 and 3. In other embodiments, the base portion 602 may not be shaped to match the shape of the housing apparatus 108. For example, the housing apparatus 108 may be substantially cube shaped and the base portion 602 may be substantially cylindrically shaped. In still other embodiments, the base portion 602 may be non-cylindrically shaped, such as diamond-shaped or rectangular-shaped, for example.

In some embodiments, the base portion 602 comprises an engagement feature configured to engage with an engagement feature of the housing apparatus 108 when the base portion 602 is coupled to the housing apparatus 108. By way of example, an axial face 606 of the base portion, which contacts the housing apparatus 108, may comprise splines 608 configured to engage with splines 318 positioned along an axially end face 312 of the housing apparatus 108 to, at times, inhibit movement and/or rotation between the housing apparatus 108 and the first modular frame 110. In still other embodiments, the splines 608 may be replaced with another engagement feature(s) such as a friction pad (e.g., a rubber pad) or other device configured to inhibit such movement and/or rotation. In some embodiments, the axial face 606 further comprises an alignment feature configured to align the first modular frame 110 with the housing apparatus 108. For example, in the illustrated embodiment, the first modular frame 110 comprises a lip 610 extending along a circumference of the axial face 606, which is configured to be seated in the channel 320 of the housing apparatus 108 to inhibit side-to-side movement of the base 604 relative to the housing apparatus 108, for example.

In the illustrated embodiment, an aperture 612 is defined at a center, for example, of the base portion 602 and is configured to provide for coupling the first modular frame 110 to the housing apparatus 108. By way of example, in some embodiments, a bolt, screw, or other fastener is inserted into the aperture 612 and connected to the housing apparatus 108. In other embodiments, a bolt, pin, or other fastener passes through the aperture 612, through the housing apparatus 108, through an aperture of a second modular frame (coupled to an opposing side of the housing apparatus 108 relative to the first modular frame 110) and is coupled to a nut or locking mechanism adjacent the second modular frame to secure the two modular frames and the housing apparatus 108 together.

The arm 604 extends outwardly from the base 602 and is configured to be coupled to a second modular frame of a second spacer assembly. In some embodiments, the arm 604 comprises an alignment feature for aligning the arm 604 with an arm of the second modular frame. By way of example, in the illustrated embodiment, the arm 604 comprises one or more alignment pins 614 and one or more alignment channels 616 configured to facilitate aligning the arm 604 with a second arm of the second modular frame. By way of example, the alignment pins 614 of the arm 604 may be configured to be positioned with an alignment channel of the second arm, and alignment pins of the second arm may be positioned within the alignment channels 616 of the arm 604. It some embodiments, alignment channels 616 are configured to allow the arm 604 to slide relative to a second arm, such that the distance between the base 602 and a second base of the second spacer assembly can be adjusted (e.g., to vary a distance between a first housing apparatus and a second housing apparatus on an application-by-application basis). Such alignment pins 614 may be integral with the arm 604 and/or detachable from the arm 604, for example.

In some embodiments, the arm 604 furthers defines one or more apertures 618 configured to be aligned with one or more apertures of the second arm, and a fastener is configured to pass through respective apertures 618 to couple the arm 604 with the second arm. The position of the one or more apertures 618 and/or the spacing between apertures 618 may be a function of a desired spacing between the first housing apparatus and the second housing apparatus. By way of example, in one embodiment, apertures 618 are spaced uniformly along the arm 604 at desired increments (e.g., one-inch increments, half-inch increments, etc.). When a short distance between a first cable, to which the first spacer assembly is attached, and a second cable, to which the second spacer assembly is attached, is desirable, the arm 604 and the second arm 604 may be slid together (e.g., causing the alignment pins of the second arm to approach the base 602) such that each aperture of the arm 604 is aligned with an aperture of the second arm. When a greater distance between cables is desirable, the arm 604 and the second arm may be slide apart (e.g., causing the alignment pins of the second arm to approach the alignment pins 614 of the first modular frame 110) such that one or more apertures 618 of the arm 604 are not aligned with one or more apertures of the second arm, for example. In other embodiments, the arms are positioned to achieve a desired spacing between cables and an aperture 608 is formed (e.g., machined) into respective arms where desired to secure the arms together and maintain the desired spacing. Accordingly, one or more aperture 608 may be formed at the time of assembly, and one or more other apertures 608 may or may not be formed when the respective arms are manufactured.

Figure 8:
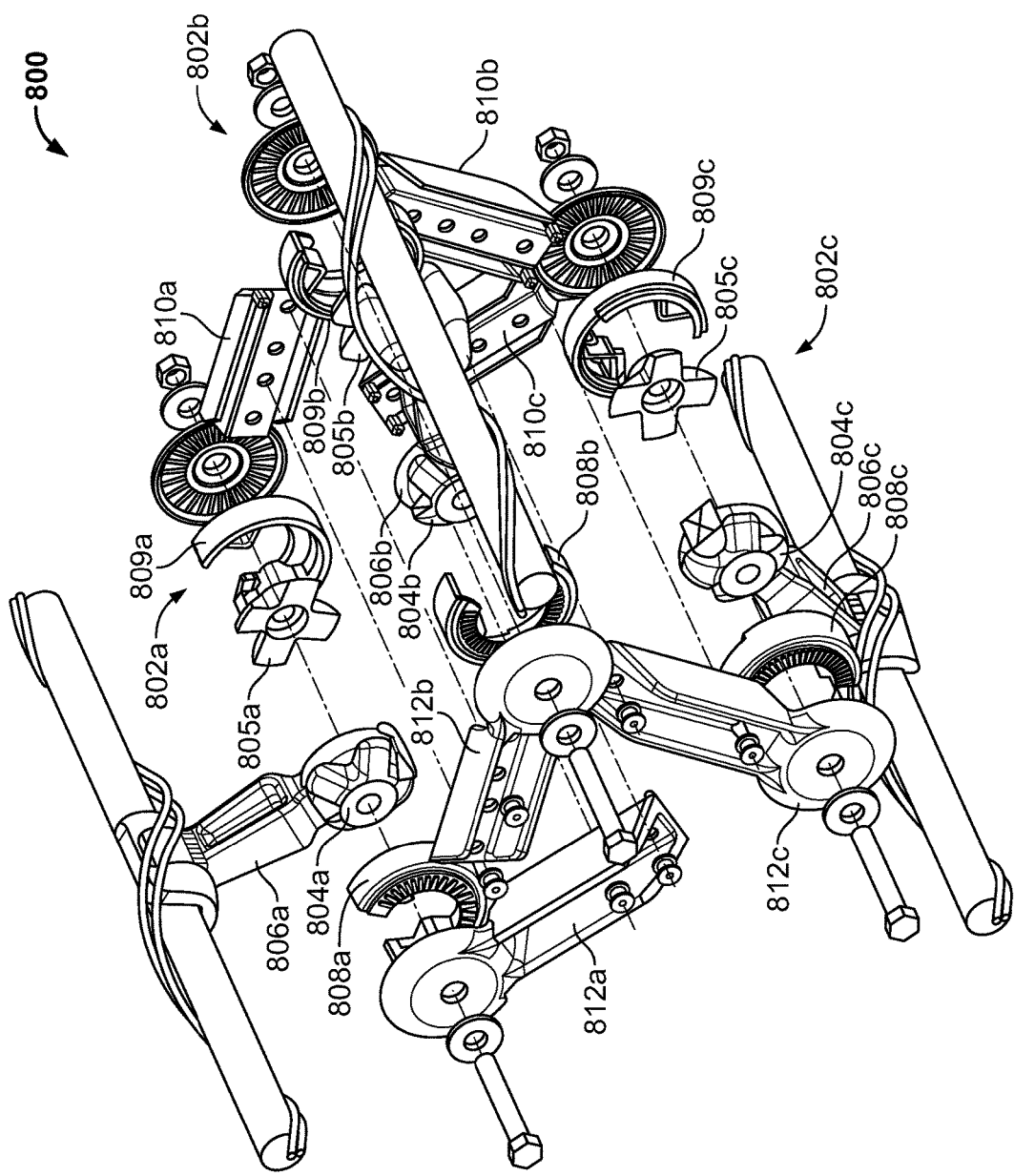
FIG. 8 illustrates an assembly of an example spacer unit for a cable bundle having a tri-configuration.

FIG. 8 illustrates an assembly of an example spacer unit 800 having a tri-configuration, which is assembled using the components described herein. The spacer unit comprises three spacer assemblies 802 which are joined together via the modular frames 810, 812.

Respective spacer assemblies 802 of the spacer unit 800 comprise a clamp arm 806, a housing apparatus formed by two c-shaped members 808, 809, and two modular frames 810, 812. A base of a first modular frame 810 is coupled to an axially end face of a first-c-shaped member 808 and a base of a second modular frame 812 is coupled to an axially end face of the second c-shaped member 809. It is to be appreciated that items of the first spacer assembly are labeled "a," items of the second spacer assembly are labeled "b," and items of the third spacer assembly are labeled "c."

In some embodiments, one or more dampening elements are further positioned on one or more sides of the clamp arm 806 within an interior cavity of the housing apparatus formed by the two c-shaped members 808, 809. For example, in the illustrated embodiment, dampening elements 804, 805 are positioned on opposite faces of the clamp arm 806. The dampening elements 804, 805, which may be constructed of an elastomer, neoprene, rubber, plastic, or other suitable material, are configured to dampen vibrations and/or oscillations experienced by the cable, for example.

Elements of the respective spacer assembly can be coupled together via a bonding agent (e.g., glue, resin, etc.), fastener (e.g., bolt and nut, pin, screw, etc.), etc. Likewise a first spacer assembly 802a can be secured to a second spacer assembly 802b via a bonding agent, fastener, etc. By way of example, in the illustrated embodiment, a bolt/nut combination is used to couple elements of respective spacer assemblies together and a rivet is used to secure respective spacer assemblies 802 together. In other embodiments, the rivet is replaced with a bolt and nut assembly to fasten respective spacer assemblies 802 together.

Figure 9:
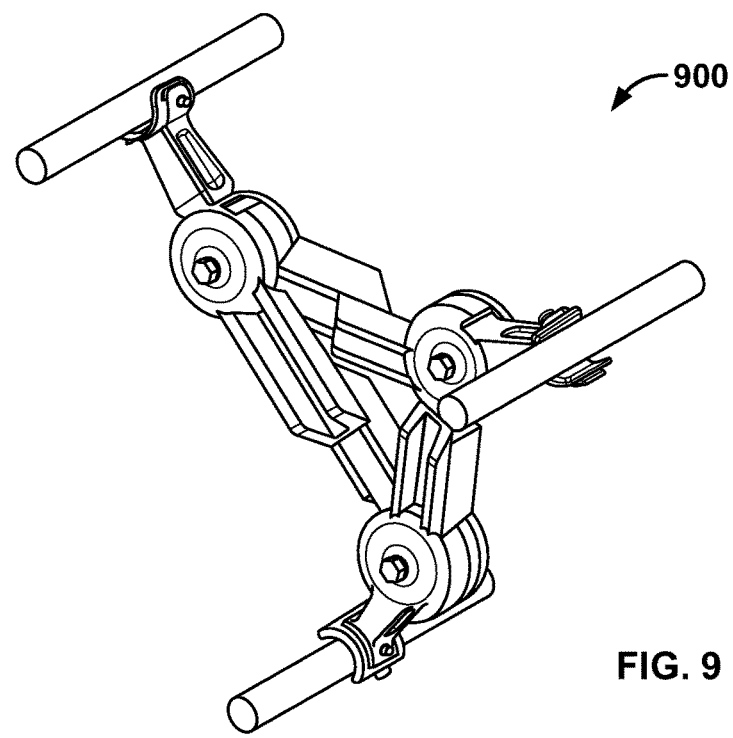
FIG. 9 illustrates an example spacer unit for a cable bundle having a tri-configuration.
Figure 10:
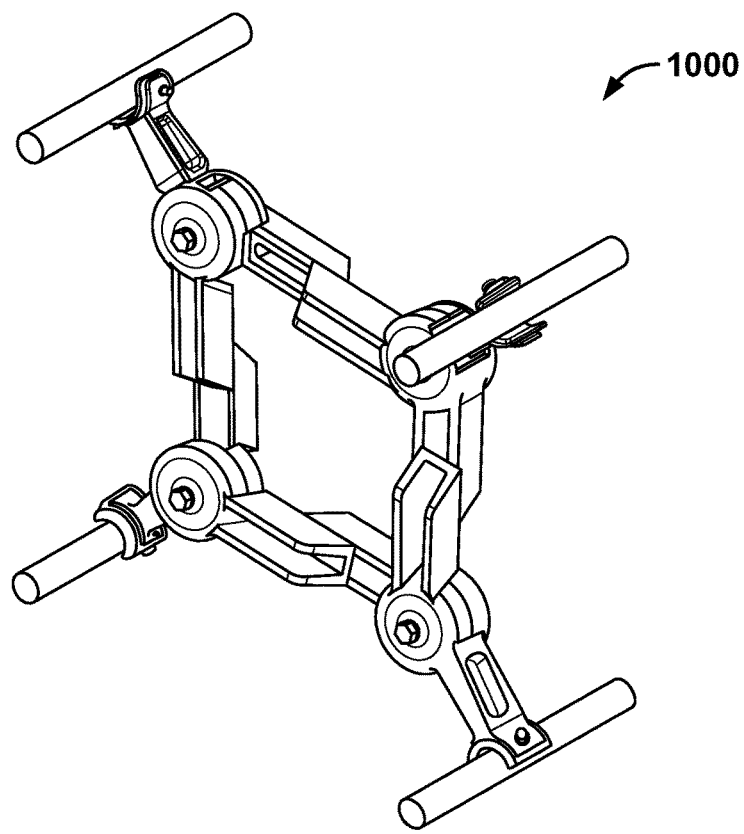
FIG. 10 illustrates an example spacer unit for a cable bundle having a quad-configuration.
Figure 11:
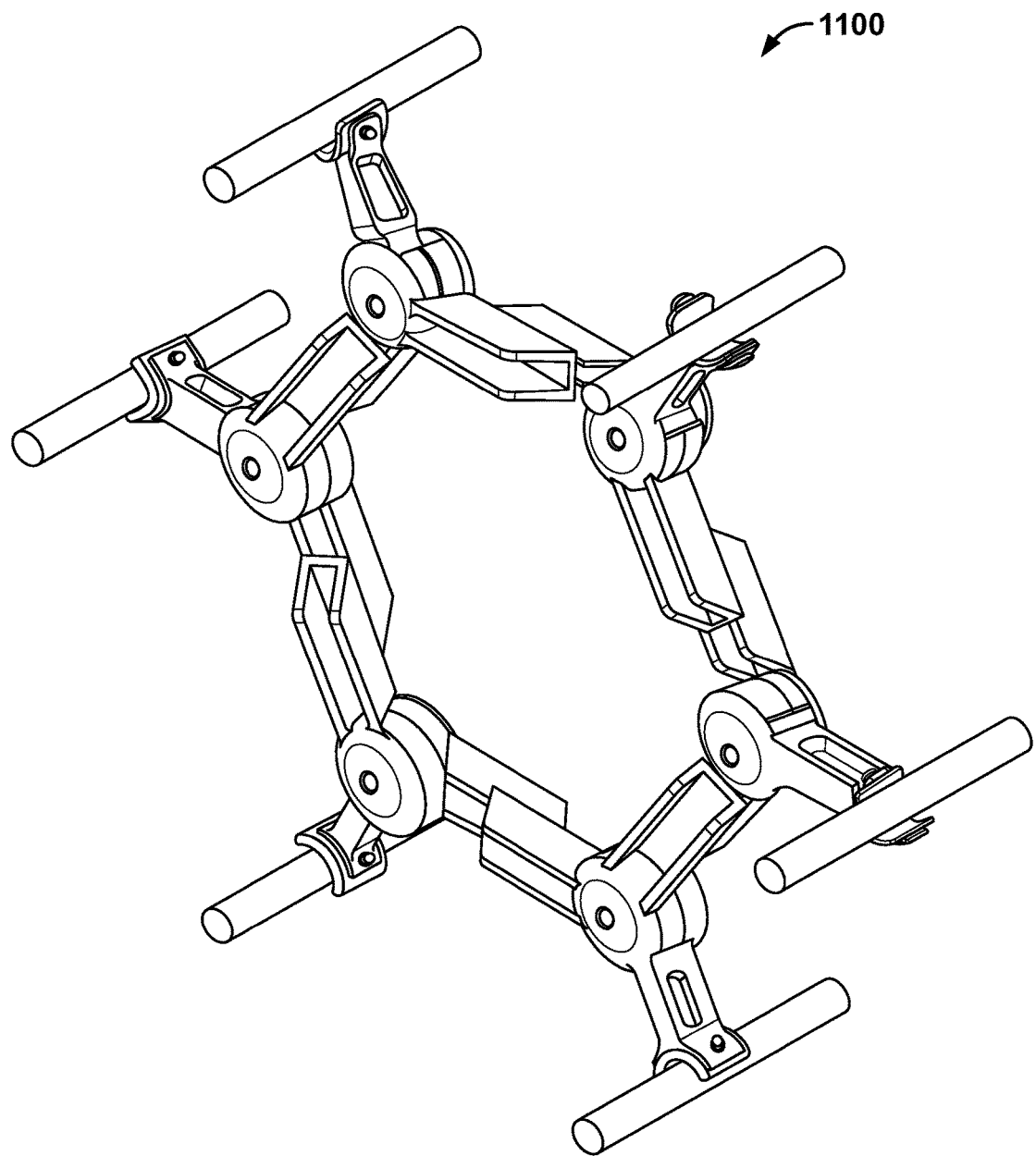
FIG. 11 illustrates an example spacer unit for a cable bundle having a hex-configuration.

FIG. 9-11 illustrates example spacer units, which may be configured to accommodate various sized cable bundles, using the foregoing elements. More particular, FIG. 9 illustrates an assembled spacer unit 900 for a bundle having a tri-configuration. FIG. 10 illustrates an assembled spacer unit 1000 for a bundle having a quad-configuration. FIG. 11 illustrates an assembled spacer unit 1100 for a bundle having a hex-configuration.

In some embodiments, a kit-of-parts for a spacer assembly may be further devised. The kit-of-parts may comprise at least some of the foregoing elements of a spacer assembly to facilitate assembly of the spacer assembly at a location other than where the parts are manufactured. For example, the kit-of-parts may be provided to an installer for on-site assembly of a spacer unit and/or may be provided to a utility for assembly by the utility or under the control of the utility, for example.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

Many modifications may be made to the instant disclosure without departing from the scope or spirit of the claimed subject matter. Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A spacer assembly for a power line, comprising:
   a clamp arm for clamping the spacer assembly to the power line;
   a housing apparatus defining an interior cavity, wherein the clamp arm comprises a base portion configured to be seated in the interior cavity to couple the clamp arm to the housing apparatus; and
   a modular frame configured to couple the spacer assembly to a second spacer assembly, the modular frame comprising:
   a substantially cylindrical base portion; and
   an arm, wherein:
   a first face of the substantially cylindrical base portion is configured to contact a first face of the housing apparatus and configured for selective rotation relative to the housing apparatus, and the arm is configured to selectively couple the modular frame to a second modular frame of the second spacer assembly.

2. The spacer assembly of claim 1, the first face of the housing apparatus comprising one or more splines configured for selective engagement with one or more splines of the first face of the substantially cylindrical base portion of the modular frame to inhibit rotation of the modular frame relative to the housing apparatus.

3. The spacer assembly of claim 1, the modular frame comprising one or more apertures configured to accommodate a fastener for fastening the modular frame to a second modular frame of the second spacer assembly.

4. The spacer assembly of claim 1, the modular frame configured to facilitate adjusting a distance between the housing apparatus of the spacer assembly and a second housing apparatus of the second spacer assembly.

5. The spacer assembly of claim 1, the housing apparatus comprising:
a first housing member comprising a first male portion and a first female portion; and
a second housing member comprising a second male portion and a second female portion, wherein the first female portion is configured to be mated with the second male portion and the first male portion is configured to be mated with the second female portion to define the interior cavity.

6. The spacer assembly of claim 1, comprising a second modular frame configured to couple the housing apparatus to a third spacer assembly, the second modular frame substantially in contact with a second face of the housing apparatus.

7. The spacer assembly of claim 6, the second modular frame configured for selective rotation relative to the housing apparatus.

8. The spacer assembly of claim 6, the second modular frame configured for selective rotation relative to the modular frame.

9. The spacer assembly of claim 6, the second face of the housing apparatus on a diametrically opposite side of the housing apparatus relative to the first face of the housing apparatus.

10. The spacer assembly of claim 1, comprising a dampening element configured to dampen vibrations on the power line.

11. A spacer unit for a power line, comprising:
a first spacer assembly comprising:
a first housing apparatus, and
a first modular frame configured for selective rotation relative to the first housing apparatus, the first modular frame comprising an alignment channel, wherein a first face of the first housing apparatus comprises one or more splines configured for selective engagement with one or more splines of a first face of the first modular frame; and
a second spacer assembly comprising:
a second housing apparatus, and
a second modular frame configured for selective rotation relative to the second housing apparatus, the second modular frame comprising an alignment pin for mating with the alignment channel.

12. The spacer unit of claim 11, wherein an engagement of the one or more splines of the first face of the first housing apparatus with the one or more splines of the first face of the first modular frame inhibits rotation of the first modular frame relative to the first housing apparatus.

13. The spacer unit of claim 11, wherein the alignment channel is sized relative to the alignment pin to facilitate a sliding motion of the alignment pin in the alignment channel.

14. The spacer unit of claim 11, the first spacer assembly comprising a dampening element configured to dampen vibrations on the power line to which the first spacer assembly is coupled.

15. The spacer unit of claim 11, the first spacer assembly comprising a third modular frame configured to couple the first spacer assembly to a third spacer assembly of the spacer unit.

16. A spacer assembly for power lines, comprising:
a clamp arm for clamping the spacer assembly to a power line;
a housing apparatus defining an interior cavity, wherein the clamp arm comprises a base portion configured to be seated in the interior cavity to couple the clamp arm to the housing apparatus; and
a modular frame configured to couple the spacer assembly to a second spacer assembly, wherein:
the modular frame is substantially in contact with a first face of the housing apparatus and configured for selective rotation relative to the housing apparatus, and
the first face of the housing apparatus comprises one or more splines configured for selective engagement with one or more splines of a first face of the modular frame to selectively inhibit rotation of the modular frame relative to the housing apparatus.

17. A spacer assembly for power lines, comprising:
a clamp arm for clamping the spacer assembly to a power line;
a housing apparatus defining an interior cavity, wherein the clamp arm comprises a base portion configured to be seated in the interior cavity to couple the clamp arm to the housing apparatus; and
a modular frame configured to couple the spacer assembly to a second spacer assembly, wherein:
the modular frame is substantially in contact with a first face of the housing apparatus and configured for selective rotation relative to the housing apparatus; and
the modular frame comprises one or more apertures configured to accommodate a fastener for fastening the modular frame to a second modular frame of the second spacer assembly.

18. A spacer assembly for power lines, comprising:
a clamp arm for clamping the spacer assembly to a power line;
a housing apparatus comprising:
a first housing member comprising a first male portion and a first female portion; and
a second housing member comprising a second male portion and a second female portion, wherein:
the first female portion is configured to be mated with the second male portion and the first male portion is configured to be mated with the second female portion to define an interior cavity, and
the clamp arm comprises a base portion configured to be seated in the interior cavity to couple the clamp arm to the housing apparatus; and
a modular frame configured to couple the spacer assembly to a second spacer assembly, the modular frame substantially in contact with a first face of the housing apparatus and configured for selective rotation relative to the housing apparatus.

19. A spacer assembly for power lines, comprising:
- a clamp arm for clamping the spacer assembly to a power line;
- a housing apparatus defining an interior cavity, wherein the clamp arm comprises a base portion configured to be seated in the interior cavity to couple the clamp arm to the housing apparatus;
- a modular frame configured to couple the spacer assembly to a second spacer assembly, the modular frame substantially in contact with a first face of the housing apparatus and configured for selective rotation relative to the housing apparatus; and
- a second modular frame configured to couple the housing apparatus to a third spacer assembly, the second modular frame substantially in contact with a second face of the housing apparatus.

20. The spacer assembly of claim 19, the second face of the housing apparatus on a diametrically opposite side of the housing apparatus relative to the first face of the housing apparatus.

* * * * *